United States Patent [19]

Unosen

[11] Patent Number: 4,823,849
[45] Date of Patent: Apr. 25, 1989

[54] WOOD PROCESSOR

[76] Inventor: Olov Unosen, Lanervägen 2, S-930 93 Laisvall, Sweden

[21] Appl. No.: 162,599

[22] Filed: Mar. 1, 1988

[51] Int. Cl.$^4$ .............................................. A01G 23/08
[52] U.S. Cl. .................................... 144/3 D; 144/2 Z; 144/335; 144/338
[58] Field of Search ............. 144/335, 338, 2 Z, 3 D, 144/34 R, 34 E; 30/379.5

[56] References Cited

U.S. PATENT DOCUMENTS

| | | | |
|---|---|---|---|
| 3,618,647 | 11/1971 | Stuart | 144/338 |
| 3,620,272 | 11/1971 | Eriksson | 144/338 |
| 4,569,379 | 2/1986 | Gemmell-Murdoch | 144/3 D |

FOREIGN PATENT DOCUMENTS

| | | | |
|---|---|---|---|
| 2356023 | 5/1974 | Fed. Rep. of Germany | 144/3 D |
| 2430113 | 1/1975 | Fed. Rep. of Germany | 144/3 D |

Primary Examiner—W. Donald Bray
Attorney, Agent, or Firm—Cushman, Darby & Cushman

[57] ABSTRACT

A wood processor for felling, delimbing and cutting tree-trunks includes a system of arms containing at least two beams (10, 12) mutually movable in the longitudinal direction, one in the other. The wood processor also includes a unit composed of a delimbing head (13) and a felling head (14) attached to one end of the arm system. At its other end, the arm system is attached to a vehicle, for example a wood tractor, and is arranged substantially horizontally. The whole unit (13, 14) is pivotable about a turning point (25) at one end of the arm system. The delimbing head (13) is attached to the inner beam of the beams (12) in the arm system and the felling head (14) is attached to the outer beam of the beams (10) in the arm system, so that the delimbing head (13) is movably arranged in the longitudinal direction of the beams (10, 12) in relation to the felling head (14).

10 Claims, 5 Drawing Sheets

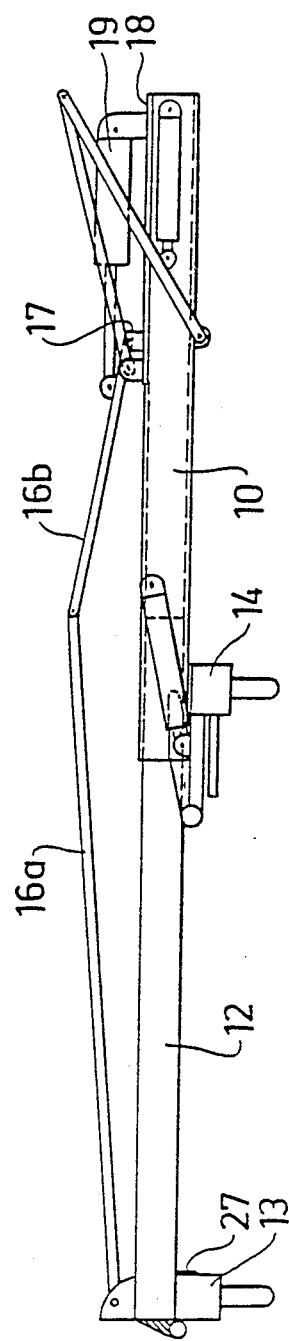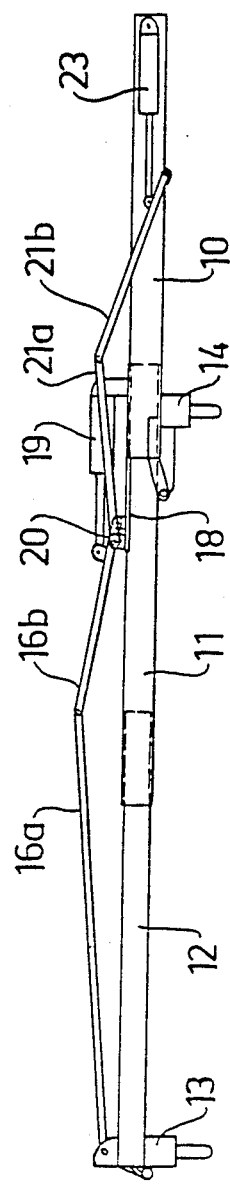

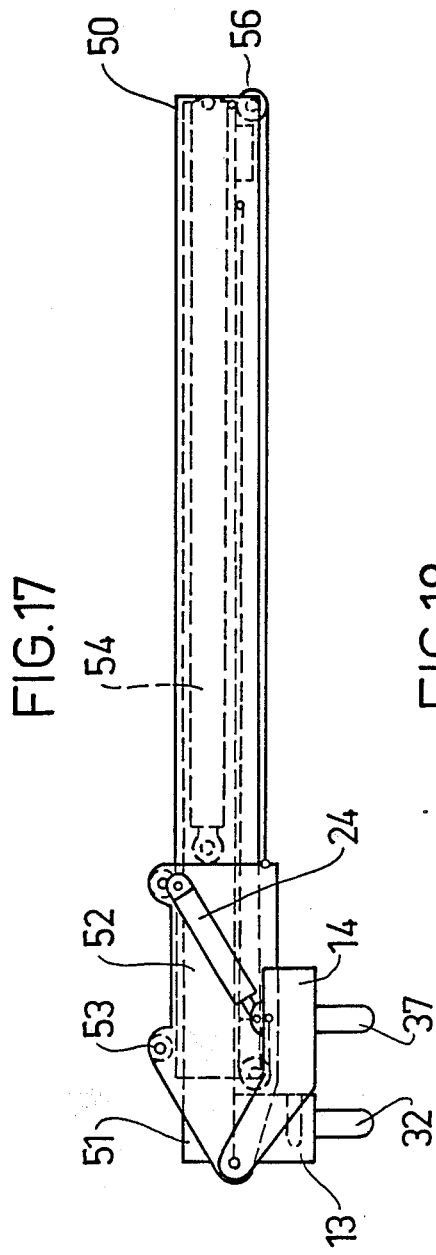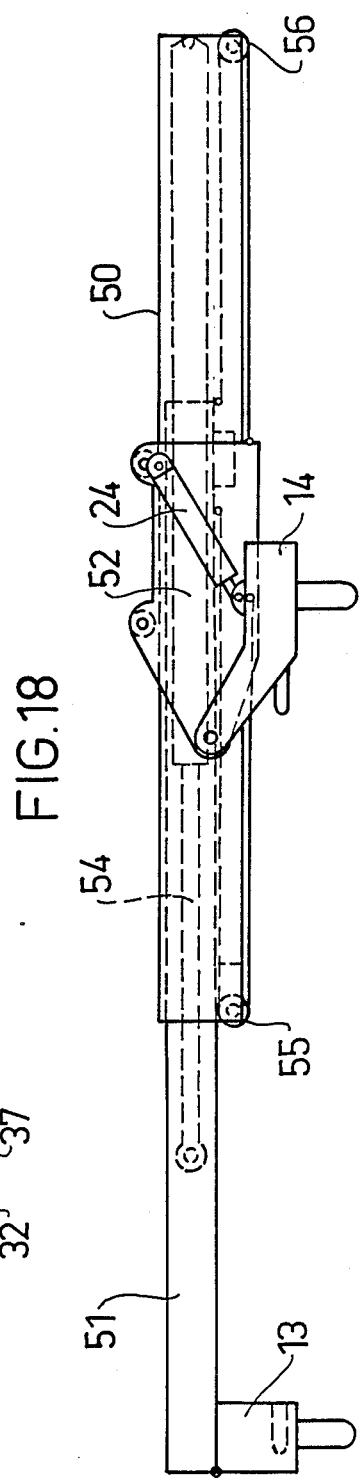

WOOD PROCESSOR

BACKGROUND OF THE INVENTION

This invention relates to a wood processor for felling, delimbing and cutting tree-trunks comprising a system of arms containing at least two beams mutually movable in the longitudinal direction, one in the other, and a unit composed of a delimbing head and a felling head attached to the arm system, especially for use as a so-called rotator unit.

Various types of wood processors for felling, delimbing and cutting tree-trunks are previously known. One of the known types is the so-called roll processor, in which the tree-trunks are fed through a processing unit by means of rolls. Disadvantages of these are, especially skidding due to formation of sap, and bad delimbing ability, in case of wood difficult to delimb. Processors with working units comprising gripping claws and a saw mounted on a beam are also known. When felling a tree, the whole unit with gripping claws and beam is aligned to a vertical position, after which the whole unit is lowered to a horizontal position for delimbing. In order not to obtain unreasonably long lengths of the beams to be raised for cutting, the beams must be kept relatively short, which limits the feeding length of the delimbing head attached to the beam to about 1-1.5 m. As a result of this, the delimbing operation must be carried out in several steps, when cutting the tree-trunk to suitable lengths. In these known beam systems, a felling head is arranged at the outermost end of the beam, and the delimbing head is arranged inside the felling head, towards the vehicle on which the beam system is mounted.

SUMMARY OF THE INVENTION

It is the object of this invention to achieve a new and simple construction of a wood processor providing a rapid and efficient processing of the trees. Another object is to keep the weight and dimensions as limited as possible for the part that is to be raised to vertical position for felling of a tree. Still another object of the invention is to provide an arm system that allows a long delimiting length with restricted minimum measures in order to enable delimbing in one step between cuts of the tree-trunk.

BRIEF DESCRIPTION OF THE DRAWINGS

The invention is now described in the form of two embodiments which are illustrated schematically in the attached drawings, in which merely the essential parts of the apparatus have been included.

In the drawings:

FIG. 3 shows the arm system in a lateral view with the arm system extended for delimbing, FIG. 4 is a view corresponding to FIG. 3, but with a further extension of the arm system, FIG. 17 is a lateral view of a second embodiment of a wood processor according to the invention showing the arm system in retracted position and a unit consisting of delimbing head and felling head attached to one end of the arm system, and FIG. 18 shows the arm system in FIG. 17 in a position, in which the arms are somewhat extracted from each other.

DETAILED DESCRIPTION

Figure 1:
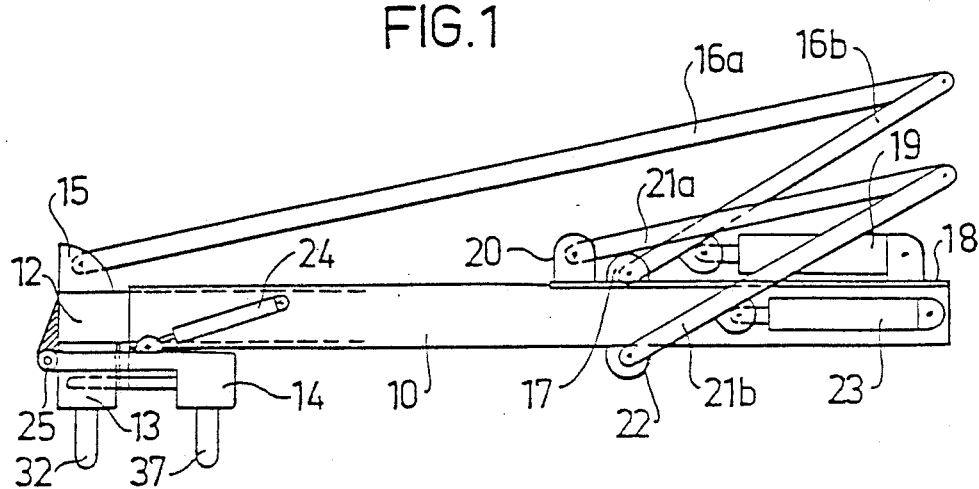
FIG. 1 is a lateral view of a first embodiment of a wood processor according to the invention, showing the arm system in retracted position and with a unit comprising a delimbing head and felling head attached to one end of the arm system.

FIG. 1 shows a wood processor according to the invention, especially a first illustrative example of the arm system and the unit in a lateral view. The arm system contains an outer beam 10 intended to be attached to a vehicle, for example a wood tractor (not shown). The arm system is particularly designed to be utilized as a so-called rotator unit at the power take-off of a usual wood tractor, but can also be used for bigger wood processing machines. Movably arranged within this outer beam 10, as an inner beam 12 which supports, at one of its ends, a delimbing head 13 connected to a felling head 14 in the position shown in FIG. 1. The felling head is attached to the outer beam 10. An attachment 15 for a double-armed hinge 16a, 16b is arranged at the outer end of the inner beam 12, one arm hinge 16a being pivotably connected at one of its ends to the attachment 15 and pivotably connected at its other end to the other arm hinge 16b. The other arm hinge 166 is pivotally attached to an attachment 17 at its other end. The attachment 17 is attached to a slide bar 18 sliding on the outer beam 10. The double-armed hinge 16a, 16b is operated by a hydraulic cylinder 19 which is also attached to the slide bar 18. An attachment 20 for a second double-armed hinge 21a, 21b is also attached to the slide bar 18, one arm hinge 21a being pivotably attached at one of its ends to the attachment 20 and pivotably connected with the other arm hinge 21b at its other end. The arm hinge 21b is pivotably connected at its other end to an attachment 22 attached to the outer beam 10. This second arm hinge 21a, 21b is operated by a second hydraulic cylinder 23. Although not apparent from the figure, a corresponding second arm hinge and second hydraulic cylinder are attached at the other side of the outer beam 10 and the other side of the slide bar 18.

Figure 2:
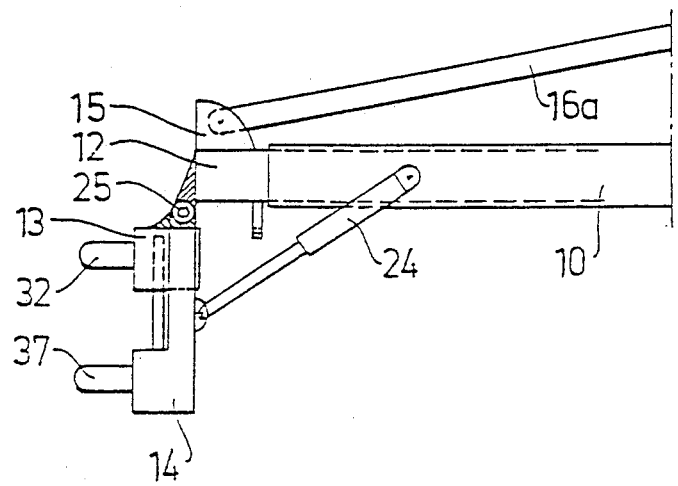
FIG. 2 shows part of the arm system in a view corresponding to FIG. 1, but the unit consisting of delimbing head and felling head pivoted to a substantially vertical position for felling.

Part of the arm system in FIG. 1 is shown in FIG. 2, viz, the outer portion of the arm system, with the difference from FIG. 1 that the unit consisting of delimbing head 13 and felling head 14 is opened to a substantially vertical position to enable felling of standing wood. As is apparent from this figure, a hydraulic cylinder 24 is attached to the outer beam 10 and to the felling head 14 at its other end to enable turning of the felling head 14 together with the delimbing head 13 about a tilt shaft 25 at the outer end of the inner beam 12.

FIG. 3 is a lateral view of the arm system in a position, in which the inner beam 12 has been moved out of the outer beam 10 and, thus, the delimbing head 13 has been separated from the felling head 14 and is spaced from the felling head 14. The inner beam 12 has been pushed out, in that the hydraulic cylinder 19 has been activated and pushed out its piston rod, which has caused turning of the arm hinge 16b about its turning point in the attachment 17 and consequently a displacement of the arm hinge 16a which has enforced extraction of the inner beam out of the outer beam. In FIG. 4, a position is shown, in which the other hydraulic cylinder 23 also has been activated and pushed out its piston rod and compelled, in this way, the arm hinge 21b to pivot about its turning point in the attachment 22, forcing, in this way, the arm hinge 21a to be moved forwards. However, this arm hinge 21a is attached to an attachment 20 on the slide bar 18, and, in this way, the slide bar 18 has been forced to be moved forwards along the outer beam 10 and move the inner beam 12 further outwards. An intermediate beam 11 arranged between the inner beam 12 and the outer beam 10 also is pushed out of the outer beam 10. This intermediate beam 11 has been drawn out of the outer beam 10, in that it has been carried along by the inner beam 12 when this has reached its furthest pushed-out position relative to the intermediate beam 11. The intermediate beam 11 can then be arranged to be brought along into the outer beam 10 upon retraction of the inner beam 12, when the inner beam 12 has reached its most pushed-in position relative to the intermediate beam 11.

Figure 5:
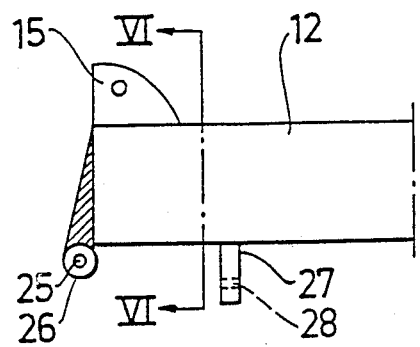
FIG. 5 shows a detail of one end of a beam in the arm system, especially, details for attaching the delimbing head to the beam.
Figure 6:
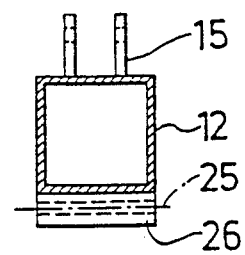
FIG. 6 is a section of the detail depicted in FIG. 5, in the direction shown by the arrows VI—VI.

FIG. 5 shows the outer end of the inner beam 12 with the attachment 15 of one arm hinge (16a) and with an attachment 26 at its underside to receive the delimbing head and turning thereof about the tilt shaft 25. As is apparent from FIG. 5, a locking plate 27 is also attached to the underside of the outer beam 12. The locking plate 27 has a hole 28 for securing the delimbing head to the beam 12 when the beam 12 is pushed out of the outer beam 10. This is described in greater detail below. FIG. 6 shows a section of the inner beam 12 according to the arrows VI—VI on FIG. 5.

Figure 7:
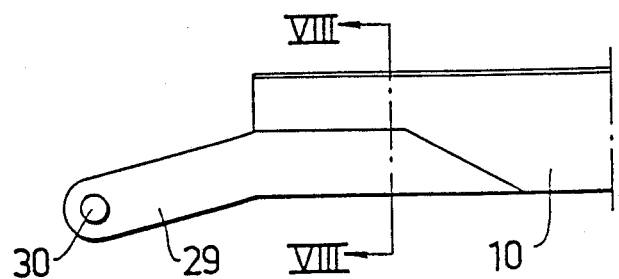
FIG. 7 shows a detail at the end of another beam in the arm system, especially, the attachment of the felling head.
Figure 8:
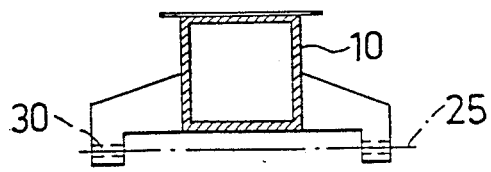
FIG. 8 is a section according to the arrows VIII—VIII in FIG. 7.

FIG. 7 is a view corresponding to FIG. 5, but of the end of the outer beam 10. This end of the outer beam supports a mounting clamp 29 for the felling head (not shown in this figure). As is apparent from FIG. 7, the mounting clamp 29 projects in the longitudinal direction of the beam 10, past the end of the beam, and has a hole 30 for attachment of a pivot pin for the suspension of the felling head. The projection of the mounting clamp 29 past the end of the beam 10 is so adapted that the center of the hole 30 coincides with the center of the attachment 26 of the delimbing head, so that the tilt shaft 25 of the felling head and that of the delimbing head coincide. For illustrative purposes, this mounting clamp 29 has been omitted in FIGS. 1–4, because it would otherwise hide other essential parts. In FIG. 8, a section according to the arrows VIII—VIII in FIG. 7 is shown, from which it is apparent that the mounting clamp also projects from the side of the outer beam 10 to leave a sufficient space between its two arm ends in order that the delimbing head and the felling head might pass therebetween.

Figure 9:
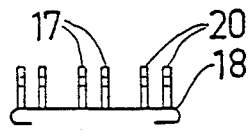
FIG. 9 is an end view of a slide bar for mounting on a beam.
Figure 11:
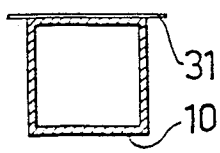
FIG. 11 is a section of the beam depicted in FIG. 10 showing the attachment of the slide bar.
Figure 10:
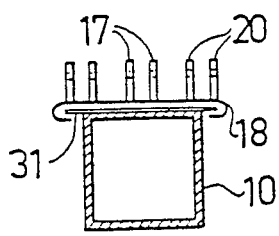
FIG. 10 is a section of the outer beam with the slide bar mounted thereon.

FIG. 9 is an end view of the slide bar 18, from which it is apparent that the slide bar comprises a supporting surface which is inwardly flanged at its ends to engage flanges 31 projecting on both sides of the outer beam 10, as is apparent from FIGS. 10 and 11. The slide bar supports attachments 17 and 20 for the arm hinges 16b and 21a, respectively. Thus, the slide bar is movable in the longitudinal direction of the outer beam, 10 and is guided along the beam in that its ends are folded around the flanges 31 projecting sidewise from the beam.

Figure 12:
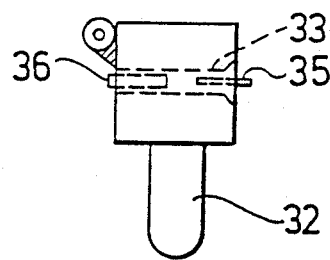
FIG. 12 is a lateral view of the delimbing head.
Figure 13:
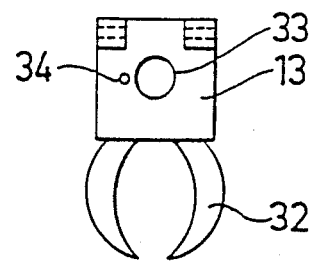
FIG. 13 is an end view of the delimbing head as seen from the left in FIG. 12.
Figure 14:
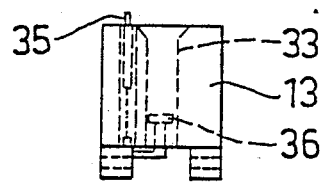
FIG. 14 is a view from above of the delimbing head as seen from above in FIG. 12.

FIGS. 12 and 13 are lateral and end views, respectively, of the delimbing head 13 carrying gripping claws 32 which are arranged at the same time to delimit a tree-trunk upon displacement of the delimbing head. The delimbing head 13 has a circular recess 33 located substantially centrally, and, in parallel with this recess 33, a smaller hole 34 extends receiving a locking pin 35. At one of its ends, this locking pin projects over the edge of the delimbing head 13 to project into the locking plate 27 when the delimbing head is in the position shown in FIGS. 3 and 4. In the hole 34, the locking pin 35 is spring biased to enter this position when not actuated by other forces, the locking pin projecting out of the delimbing head. At its other end, the locking pin is bent with substantially two right angles and projects with an end surface 36 into the recess 33. This end surface 36 and its bending are made to be able to displace the locking pin 35 out of engagement with the locking plate 27 and into the delimbing head upon insertion of an actuating means into the recess.

Figure 15:
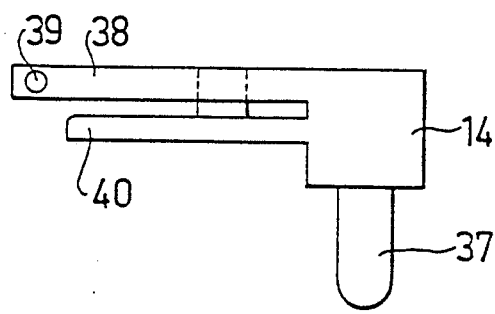
FIG. 15 is a lateral view of the felling head.
Figure 16:
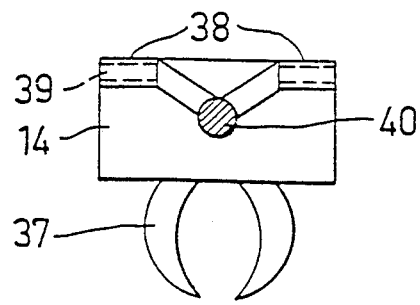
FIG. 16 is an end view of the felling head from the left in FIG. 15.

FIGS. 15 and 16 are a lateral view and an end view, respectively, of the felling head 14. The felling head 14, also, supports gripping claws 37 and a cutter which, however, is not shown in the drawings. The felling head 14 has attaching arms 38 which have through holes 39 at their ends, in which pins can be attached to connect the attaching arms 38 and, consequently, the felling head 14 with the mounting clamp 29, in that the pin passes through the holes 30 in the mounting clamp. The felling head has a substantially circular projection 40 projecting in parallel with the attaching arms and somewhat beneath these. The projection 40 is arranged to project into the recess 33 in the delimbing head 13 when the beams have been moved to the position shown in FIGS. 1 and 2. When the projection is introduced into the recess 33 in the delimbing head, the projection 40 will press the end surface 36 further into the recess and move, in this way the locking pin 35 out of engagement with the locking plate 27. By this movement, the delimbing head 13 is then connected to the felling head 14 and can be turned around the tilt shaft 25 when the felling head is actuated by the hydraulic cylinder 24. Although not shown in FIGS. 15 and 16, the felling head 14 is also provided with an attachment for attaching the piston rod of the hydraulic cylinder 24, as is apparent from FIGS. 1 and 2.

The elements described herein as attachments are shown including respective ear-like flanges mounted on the respective parts, and having openings for respective pins for pivotally securing the respective other elements to the elements on which the ear-like flanges are mounted.

The elements described herein as arm hinges are, perhaps, more accurately thought of as being hinge arms.

By the arrangements according to the invention, a relatively simple and easily-operable unit consisting of a delimbing head and a felling head has been achieved, which can be easily opened to the position shown in FIG. 2 for felling standing wood. Felling is then carried out by means of the cutter mentioned above, but not shown in the drawing, which can be of a type usual with wood processors and, for example, a hydraulically-operated chain saw.

When a tree is to be felled, the wood processor is driven up to the tree with the arm system in the position shown in FIG. 1, with the end provided with the delimbing head 13 and felling head 14 close to the tree to be felled. The hydraulic cylinder 24 is thereafter activated to lower the felling head 14 and the delimbing head 13 to the position shown in FIG. 2, after which the gripping claws of these two units grab the tree-trunk in a conventional manner and the cutter saws off the tree. After this, the tree is felled, in that the hydraulic cylinder 24 retracts its piston rod and folds-up the felling head 14 back to the position shown in FIG. 1. When the felling head thereafter has returned to the position shown in FIG. 1, the gripping claws 32 of the delimbing head will loosen their grip somewhat and the tree-trunk is held fast merely by the gripping claws 37 on the felling head 14. The hydraulic cylinder 19 is thereafter activated and actuates the double-armed hinge 16a, 16b, pushing out the inner beam 12 and, consequently, the delimbing head 13 away from the felling head. The delimbing head 13, moving along the tree-trunk, and the gripping claws 32, running loosely against the tree-trunk, will then delimb the tree-trunk, and in dependence on the desired length of the trunk, the other hydraulic cylinder 23 can also be activated when the inner beam 12 has been pushed out, in order to also push out the intermediate beam 11 to the position shown in FIG. 4, by the displacement of the slide bar 18. When the intended length of the tree-trunk has been reached, corresponding to the distance between the delimbing head 13 and the felling head 14, the gripping claws 32 of the delimbing head 13 will again grab firmly around the tree-trunk, while the gripping claws 37 of the felling head 14 will loosen their grip somewhat, after which the hydraulic cylinders 19 and 23, respectively, are again activated to draw-in the beams 11 and 12 to the position shown in FIG. 1. When this has been attained, the saw in the felling head 14 is activated to cut-off the tree-trunk and a new delimbing process can next be carried out.

FIG. 17 shows a illustrative example of an arm system for a wood processor according to the invention. In this design, the arm system is composed of merely two arms, an outer beam 50 which at one of its ends is intended to be attached to a wood tractor and receives displaceably in itself an inner beam 51 which receives a delimbing head 13 at its outer end. The outer beam 50 carries a felling head 14. The delimbing head 13 and felling head 14 are of the same design as described in connection with the first illustrative example, however with the single essential difference that the felling head 14 in connection with the second illustrative example is attached to a traveling carriage 52 which is movable along the outer beam 50. The traveling carriage 52 can preferably run by means of rollers 53 on the upper side of the outer beam. As in the first illustrative example, the felling head 14 can be opened to a substantially vertical position by means of a hydraulic cylinder 24 attached to the traveling carriage 52. In order that the inner beam 51 might be pushed out of the outer beam 50 for extension of the arm system, an hydraulic cylinder 54 is arranged within the outer beam 50 and attached to each beam 50, 51 by one attaching point. At both ends of the outer beam 50, chain wheels 55, 56 are arranged for control of chains 57, 58, which are attached at their one ends to the inner beam 51 and at their other ends to the traveling carriage 52 in such a way that the carriage moves on the outer beam 50 in a opposite direction relative to the inner beam 51. By this embodiment of the arm system, a very simple and easy construction is obtained which can be carried even by small tractors.

I claim:

1. A wood processor for felling, delimbing and cutting a tree trunk, comprising:
    an arm system including a series of telescopically-related longitudinally-elongated beams, including an outer beam having an inner end mountable to a vehicle, and an outer end, and an inner beam having an outer end, said arm system being longitudinally retractable and extensible between a retracted position in which the outer end of the inner beam is located adjacent the outer end of the outer beam, and an extended position in which the outer end of the inner beam is spaced substantially away from said outer end of said outer beam longitudinally of said arm system;
    a delimbing head having a set of openable-closable trunk-grasping claws;
    means pivotally connecting said delimbing head to said outer end of said inner beam for pivotal movement about a first horizontal axis between a horizontal position in which said delimbing head faces downwards, and a vertical position in which said delimbing head faces forwards;
    a felling head having a set of openable-closable trunk-grasping claws;
    means pivotally connecting said felling head to said outer end of said outer beam for pivotal movement about a second horizontal axis between a horizontal position in which said felling head faces downwards, and a vertical position in which said felling head faces forwards;
    said first and second horizontal axes being substantially coaxial when said arm system is in said retracted position;
    said delimbing head and said felling head being provided with respective disconnectable connecting means operable to connect said delimbing head and said felling head together for coordinated pivoting about said first and second horizontal axes when said arm system is in said retracted position, and which are operable to disconnect said delimbing head from said felling head as said arm system extends from said retracted position towards said extended position;
    means engaged with said arm system and at least one of said delimbing and felling heads, when said arm is in said retracted condition, for coordinately pivoting said delimbing and felling heads, about said horizontal axes, between said vertical and horizontal positions;
    means engageable with said beams for longitudinally extending and retracting said arm system between said retracted and extended positions thereof; and said felling head being adapted for mounting of a cutter thereto, whereby, in use, with the arm system in its retracted position, the delimbing and felling heads may be pivoted to the vertical positions thereof by said coordinately pivoting means, and said trunk-grasping claws of said delimbing and felling heads operated to grasp an upright tree trunk, to thereby hold a tree while the trunk is cut off by a cutter, whereupon the coordinately pivoting means may be operated to pivot said delimbing and felling heads to the horizontal positions thereof, thereby felling the cut-off tree, whereupon the claws of the delimbing head may be relaxed somewhat while the claws of the felling head continue to grasp the tree trunk, and the means for extending and retracting the arm system operated to extend the arm system from said retracted position towards said extended position thereof, thereby disconnecting said disconnectable connecting means so that said delimbing head becomes disconnected from said felling head and is moved longitudinally of the tree trunk with the claws of the delimbing head in interfering relation with limbs projecting radially outwards from the trunk, thereby at least partially delimbing the trunk, whereupon the claws of the delimbing head may be tightened again into gripping relation with the trunk, the claws of the felling head relaxed somewhat, and the means for extending and retracting the arm system towards said retracted position thereof thereby bringing a site on said trunk at which a cut is to be made, into adjacency with said feeling head, for cutting.

2. A wood processor of claim 1, wherein:

said means for coordinately pivoting said delimbing and felling heads comprises an extensible-retractable, pressurized fluid-operated piston and cylinder arrangement connected between said felling head and one of said beams.

3. The wood processor of claim 2, wherein:

said disconnectable connecting means comprise a pin on one of said heads receivable in a recess in the other of said heads, said pin and socket being longitudinally oriented on said arm system when said heads are in said horizontal positions thereof and said arm system is in said retracted position thereof.

4. The wood processor of claim 3, further including:

locking means arranged to be operated by receipt of said pin in said recess and withdrawal of said pin from said recess, for preventing said delimbing head from pivoting about said first horizontal axis from said horizontal position thereof towards said vertical position thereof, unless said pin is received in said socket.

5. The wood processor of claim 1, wherein:

said means for longitudinally extending and retracting said arm system comprises an extensible-retractable, pressurized fluid-operated piston and cylinder arrangement and means operatively connecting said piston and cylinder arrangement between said inner beam and said outer beam.

6. The wood processor of claim 5, wherein:

said means operatively connecting between said outer beam and said piston and cylinder arrangement comprises a pivot joint at one end of said piston and cylinder arrangement; and said means operatively connecting said piston and cylinder arrangement between said inner beam and said piston and cylinder arrangement comprises:

a first hinge arm of a first hinge;
a second hinge arm of said first hinge;
a pivot joint hinging said first and second hinge arms together at respective one ends thereof;
a pivot joint pivotally connecting an opposite end of said first hinge arm with said inner beam;
a pivot joint pivotally connecting an opposite end of said second hinge arm with said outer beam; and a pivot joint connecting an opposite end of said piston and cylinder arrangement with said second hinge arm intermediate said ends of said second hinge arm.

7. The wood processor of claim 6, wherein:

said pivot joint connecting said opposite end of said piston and cylinder arrangement with said second hinge arm is located on said second hinge arm closer to opposite end of said second hinge arm than to said one end of said second hinge arm.

8. The wood processor of claim 6, wherein:

said means operatively connecting between said outer beam and said one end of said piston and cylinder arrangement further comprises:

a slide bar; and
means mounting said slide bar on said outer beam for longitudinal sliding therealong;

said pivot joint of said means operatively connecting between said outer beam and said one end of said piston and cylinder arrangement being provided on said slide bar;

said pivot joint pivotally connecting between said opposite end of said second hinge are and said outer beam also being provided on said slide bar;

a second hinge including:
  a first hinge arm pivotally connected at one end thereof to a second hinge are at one end thereof by a pivot joint;
  pivot joint means pivotally connecting an opposite end of said first hinge arm of said second hinge to said slide bar;
  pivot joint means pivotally connecting an opposite end of said second hinge arm of said second hinge directly to said outer beam; and
  an extensible-retractable, pressurized fluid-operated piston and cylinder arrangement pivotally connected by pivot means at one end thereof to said outer beam, and pivotally connected by pivot means at an opposite end thereof to said second hinge arm of said second hinge at a site intermediate said one and opposite ends of said second hinge arm of said second hinge.

9. The wood processor of claim 1, wherein:

said series of beams further includes an intermediate beam located between said inner beam and said outer beam.

10. The wood processor of claim 1, further including:

means longitudinally slidingly mounting said felling head on said outer beam; and means operatively connecting said felling head slidingly mounting means with said means for longitudinally extending and retracting said arm system, so that as said arm system is extended, said felling head is moved longitudinally relative to said outer beam, away from said delimbing head, and as said arm system is retracted, said felling head is moved longitudinally relative to said outer beam, towards said delimbing head.

* * * * *